United States Patent
Byun et al.

(10) Patent No.: US 10,523,280 B2
(45) Date of Patent: Dec. 31, 2019

(54) METHOD AND DEVICE FOR RECEIVING SIGNAL IN WIRELESS COMMUNICATION SYSTEM TO WHICH MULTIPLE-TRANSMISSION TECHNIQUE IS APPLIED

(71) Applicant: LG ELECTRONICS INC., Seoul (KR)

(72) Inventors: Ilmu Byun, Seoul (KR); Heejeong Cho, Seoul (KR); Genebeck Hahn, Seoul (KR); Jiwon Kang, Seoul (KR); Heejin Kim, Seoul (KR); Hyunjin Shim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/308,785

(22) PCT Filed: Jun. 13, 2017

(86) PCT No.: PCT/KR2017/006147
§ 371 (c)(1),
(2) Date: Dec. 10, 2018

(87) PCT Pub. No.: WO2017/217740
PCT Pub. Date: Dec. 21, 2017

(65) Prior Publication Data
US 2019/0149197 A1 May 16, 2019

Related U.S. Application Data

(60) Provisional application No. 62/353,571, filed on Jun. 23, 2016, provisional application No. 62/351,286, filed on Jun. 16, 2016.

(51) Int. Cl.
*H04B 7/024* (2017.01)
*H04B 7/06* (2006.01)
(Continued)

(52) U.S. Cl.
CPC ............. *H04B 7/024* (2013.01); *H04B 7/026* (2013.01); *H04B 7/06* (2013.01); *H04B 7/0628* (2013.01);
(Continued)

(58) Field of Classification Search
CPC ........ H04B 7/024; H04B 7/06; H04B 7/0628; H04L 1/0003; H04L 1/0009; H04L 1/0057; H04W 72/048
See application file for complete search history.

(56) References Cited

U.S. PATENT DOCUMENTS

| 2010/0284345 A1 | 11/2010 | Rudrapatna et al. |
| 2013/0176988 A1 | 7/2013 | Wang et al. |

(Continued)

FOREIGN PATENT DOCUMENTS

WO    2008024057    2/2008

OTHER PUBLICATIONS

PCT International Application No. PCT/KR2017/006147, International Search Report dated Sep. 14, 2017, 4 pages.

*Primary Examiner* — Freshteh N Aghdam
(74) *Attorney, Agent, or Firm* — Lee Hong Degerman Kang & Waimey

(57) ABSTRACT

Provided is a method and device for receiving a signal in a wireless communication system to which a multiple-transmission technique is applied. A proposed wireless communication system proposes a method for maximizing packet transmission within a target time in multiple paths. Specifically, a terminal receives, from a first base station, multiple-transmission activation information and control information for transmission of a transmission block. The terminal decodes the multiple-transmission activation information and the control information, and receives the transmission block from the first base station and a second base station. At this time, the multiple-transmission activation information includes a multiple-transmission activation indicator indicating that the first base station and the second base station can transmit the transmission block until a preconfigured time.

15 Claims, 12 Drawing Sheets

(51) Int. Cl.
*H04L 1/00* (2006.01)
*H04W 72/04* (2009.01)
*H04B 7/026* (2017.01)
*H04B 7/08* (2006.01)
*H04L 5/00* (2006.01)
*H04W 72/12* (2009.01)

(52) U.S. Cl.
CPC ......... *H04B 7/0842* (2013.01); *H04L 1/0003* (2013.01); *H04L 1/0009* (2013.01); *H04L 1/0057* (2013.01); *H04L 5/00* (2013.01); *H04W 72/048* (2013.01); *H04W 72/12* (2013.01)

(56) References Cited

U.S. PATENT DOCUMENTS

| | | | |
|---|---|---|---|
| 2014/0056278 A1* | 2/2014 | Marinier | H04W 72/044 370/330 |
| 2014/0198744 A1* | 7/2014 | Wang | H04B 7/0617 370/329 |
| 2014/0307622 A1 | 10/2014 | Horn et al. | |
| 2015/0063252 A1* | 3/2015 | Zhang | H04B 7/024 370/329 |
| 2016/0165626 A1* | 6/2016 | Finne | H04W 72/1278 370/336 |
| 2017/0141903 A1* | 5/2017 | Xu | H04L 1/0005 |
| 2018/0249363 A1* | 8/2018 | Lu | H04L 5/0057 |

\* cited by examiner

METHOD AND DEVICE FOR RECEIVING SIGNAL IN WIRELESS COMMUNICATION SYSTEM TO WHICH MULTIPLE-TRANSMISSION TECHNIQUE IS APPLIED

CROSS-REFERENCE TO RELATED APPLICATIONS

This application is the National Stage filing under 35 U.S.C. 371 of International Application No. PCT/KR2017/006147, filed on Jun. 13, 2017, which claims the benefit of U.S. Provisional Application Nos. 62/351,286, filed on Jun. 16, 2016, and 62/353,571, filed on Jun. 23, 2016, the contents of which are all hereby incorporated by reference herein in their entirety.

BACKGROUND OF THE INVENTION

Field of the Invention

The present invention relates to wireless communication and, most particularly, to a method for receiving a signal in a wireless communication system to which a multiple-transmission technique is applied, and a device using the same.

Related Art

A wireless communication system is widely deployed to provide various types of communication services, such as voice and data. An object of a wireless communication system is to enable a plurality of terminals to perform reliable communication regardless of their locations and mobility.

In general, a wireless communication system is a multiple access system capable of supporting communication with a plurality of terminals by sharing available radio resources. Examples of radio resources include time, a frequency, code, transmission power and so on. Examples of a multiple access system includes a time division multiple access (TDMA) system, a code division multiple access (CDMA) system, a frequency division multiple access (FDMA) system, an orthogonal frequency division multiple access (OFDMA) system, a single carrier frequency division multiple access (SC-FDMA) system and so on.

A Coordinated Multi-Point system (hereinafter referred to as a system performing CoMP operations) refers to a system for enhancing throughput of a user being located at a cell boundary by applying enhanced multiple-input multiple-output (MIMO) transmission in a multi-cell environment. When a system performing CoMP operations is applied, inter-cell interference within a multi-cell environment may be reduced. If a system performing such CoMP operations is used, the user equipment (UE) may be capable of receiving shared data from a multi-cell base station.

However, in the next generation wireless communication systems, the issue of transmitting highly reliable data within a short period of time is becoming more important. Accordingly, manifold transmission for high reliability low latency communication may be taken into consideration.

SUMMARY OF THE INVENTION

Technical Objects

This specification provides a method and device for receiving a signal in a wireless communication system to which a multiple-transmission technique is applied.

Technical Solutions

This specification proposes a method and device for receiving a signal in a wireless communication system applying a manifold transmission (or multiple-transmission) technique (or method).

The device includes a radio frequency (RF) unit transmitting and receiving radio signals, and a processor being operatively connected to the RF unit.

The terms will first be described. A manifold transmission (or multiple transmission) method (or technique) refers to a technique for maximizing the number of signal transmission sessions and diversity within a limited time by using multiple paths. The manifold transmission may also be referred to as multi-path transmission or manifold transmission. A first base station may correspond to the primary TRP, and a second base station may correspond to the secondary TRP.

Firstly, the UE receives manifold transmission activation information and control information for transmitting a transport block from the first base station. The manifold transmission activation information includes a manifold transmission activation indicator indicating that the first base station and the second base station are capable of transmitting the transport block until a predetermined time without establishing any cooperation between one another. More specifically, the first base station indicates to the UE that the manifold transmission for the transport block is activated until a specific time.

Additionally, the manifold transmission method may use two level DCI. Herein, the manifold transmission activation information may be delivered by using level 1 DCI, and control information (scheduling information) for the transmission of a transport block may be delivered by using level 2 DCI. Herein, the level 1 DCI and the level 2 DCI may be transmitted from the same control channel of a subframe or a slot or a mini-slot. Alternatively, the level 1 DCI and the level 2 DCI may be transmitted from a control channel of different subframes or slots or mini-slots. Alternatively, the level 1 DCI may be transmitted from a control channel of a subframe or a slot or a mini-slot, and the level 2 DCI may be transmitted from a data channel of a subframe or a slot or a mini-slot.

The UE decodes the manifold transmission activation information and the control information and then receives the transport block from the first base station and the second base station. More specifically, the UE may use a path between the UE and the first base station and a path between the UE and the second base station, thereby being capable of receiving signals that are transmitted from the first base station and the second base station within a limited time through multiple paths.

Additionally, the UE may also receive the manifold transmission activation information from the second base station. In addition to the first base station, since the UE also receives a transport block from the second base station as well, the activation information notifying (or announcing) the initiation of the manifold transmission may also be delivered from the second base station, thereby enhancing the reliability level of the signal. Moreover, the manifold transmission activation information may further include the predetermined time and a number of the transport blocks.

Additionally, the manifold transmission activation information may be repeatedly received from the same resource. The UE may combine the repeatedly received manifold transmission activation information and may then decode the combined information. At this point, the manifold transmission activation information may be configured to have the same bit length as the control information.

Additionally, the manifold transmission activation information received from the first base station and the manifold transmission activation information received from the second base station may be configured of the same information. The manifold transmission activation information received from the first base station and the manifold transmission activation information received from the second base station may be received by the same resource. Although the reliability level may be enhanced by combining and decoding the manifold transmission activation information, this may be disadvantageous in that the level of complexity in the UE may be increased. As described above, the length of the information and the position of the transmission resource are unified in order to minimize such disadvantage.

Additionally, the UE may combine the transport blocks received from the first base station and the second base station and may then decode the combined transport blocks. At this point, the transport blocks, which are received from the first base station and the second base station, may be transmitted by using a bit length of a mother code used by the first base station and the second base station, a code rate of the mother code, and a parity bit generation order. The bit length of the mother code, which is used by the first base station and the second base station, and the code rate of the mother code may be configured to be equal to one another. And, the parity bit generation order of the first base station and the second base station may be determined in accordance with an identifier of the first base station and an identifier of the second base station.

In order to allow the UE to combine and decode different signals, the first base station may signal the bit length of the mother code, the code rate of the mother code, and the parity bit generation order, which are pre-arranged between the first base station and the second base station, to the UE. Thus, the UE may be capable of combining the transport blocks, which are received from the first base station and the second base station, and easily decoding the combined transport blocks.

Additionally, the control signal information includes resource allocation information, MCS, a multi-antenna transmission method, a New Data Indicator (NDI), a Process ID, and so on.

The process ID may be mapped to the transport blocks that are received from the first base station and the second base station. The process ID information is shared by the primary TRP and the secondary TRPs, and the process ID information is included in the control information for the transmission of a transport block and then transmitted each time a transport block is transmitted.

The process ID may be expired after the predetermined time or in case the NDI is triggered. If time still remains before the expiration of the process ID, the transport blocks received from the first base station and the second base station may be combined and then decoded. However, if the process ID is already expired, the transport blocks received from the first base station and the second base station may each be decoded without being combined, or only the transport block received from the first base station may be decoded. More specifically, in case the expiration of the process ID does not correspond to the expiration of the manifold transmission, the transport blocks received from the first base station and the second base station may each be separately decoded without being combined. However, if the expiration of the process ID is also regarded as the expiration of the manifold transmission, only the transport block received from the first base station may be decoded.

Furthermore, prior to performing the above-described operation, a process for updating the TRP group for the manifold transmission may be needed.

The UE may receive a request for a channel quality value corresponding to a base station group, to which the manifold transmission method is applied, from the first base station. Thereafter, the UE may update the channel quality value corresponding to the base station group and may then transmit the updated channel quality value to the first base station. The UE may receive, from the first base station, identification information of the second base station, which is selected by the first base station, among the base station group. Thus, the UE may know (or acknowledge) that the second base station is included in the base station group for performing the manifold transmission.

Effects of the Invention

When using the proposed technique (or method), by increasing the number of transmissions of a packet and the diversity within a restricted (or limited) period of time, a packet transmission likelihood may be increased within a target time.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in a downlink and uses the SC-FDMA in an uplink.

For clarity of explanation, the following description will focus on the 3GPP LTE/LTE-A. However, technical features of the present invention are not limited thereto.

Figure 1:
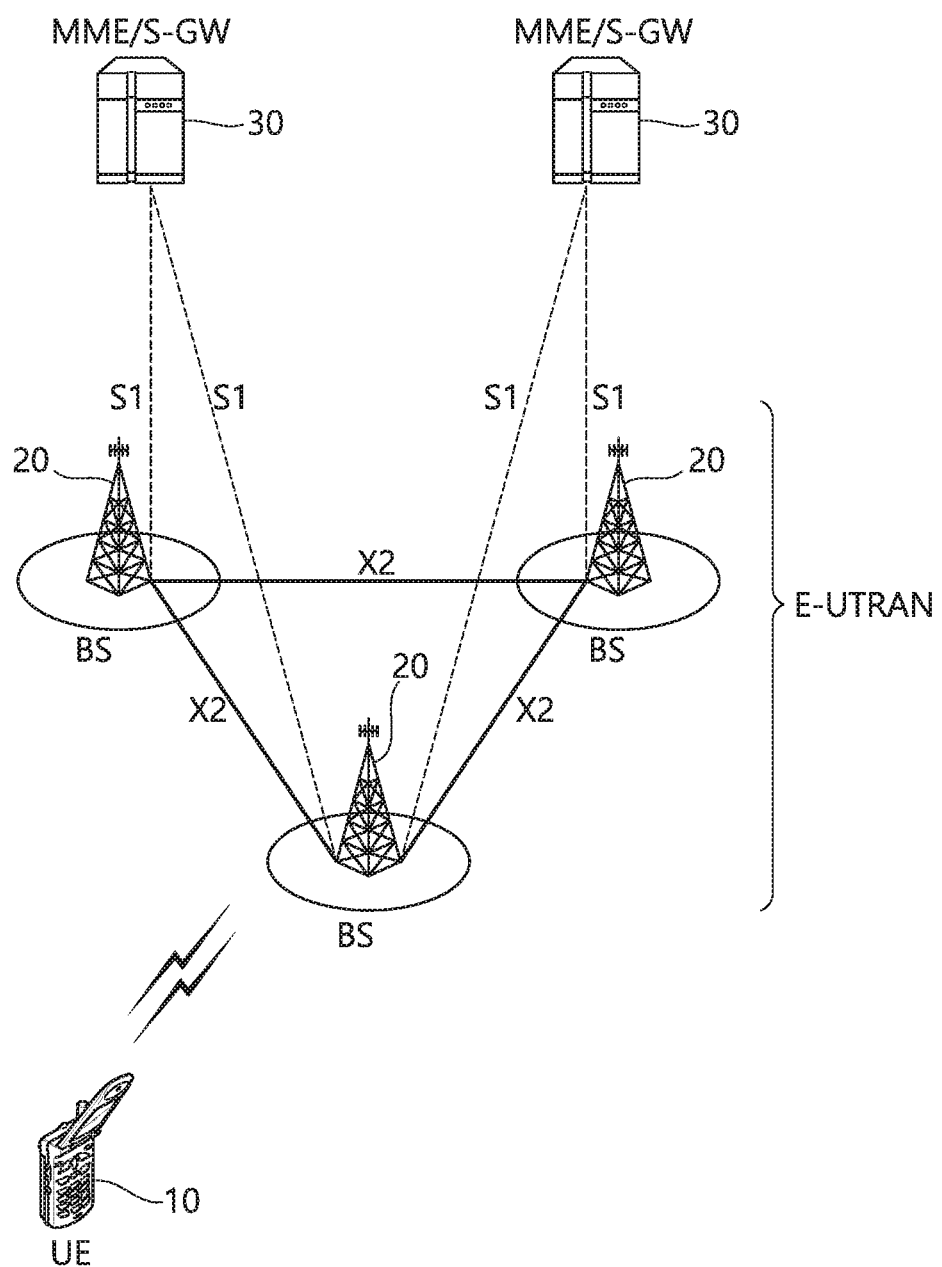
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

The E-UTRAN includes at least one base station (BS) (20) which provides a control plane and a user plane to a user equipment (UE) (10). The UE (10) may be fixed or mobile, and may be referred to as another terminology, such as a mobile station (MS), a user terminal (UT), a subscriber station (SS), a mobile terminal (MT), a wireless device, etc. The BS (20) is generally a fixed station that communicates with the UE (10) and may be referred to as another terminology, such as an evolved node-B (eNB), a base transceiver system (BTS), an access point, and so on.

The BSs (20) are interconnected by means of an X2 interface. The BSs (20) are also connected by means of an S1 interface to an evolved packet core (EPC) (30), more specifically, to a mobility management entity (MME) through S1-MME and to a serving gateway (S-GW) through S1-U.

The EPC (30) includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

A radio interface between the UE and the BS is called a Uu interface. Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
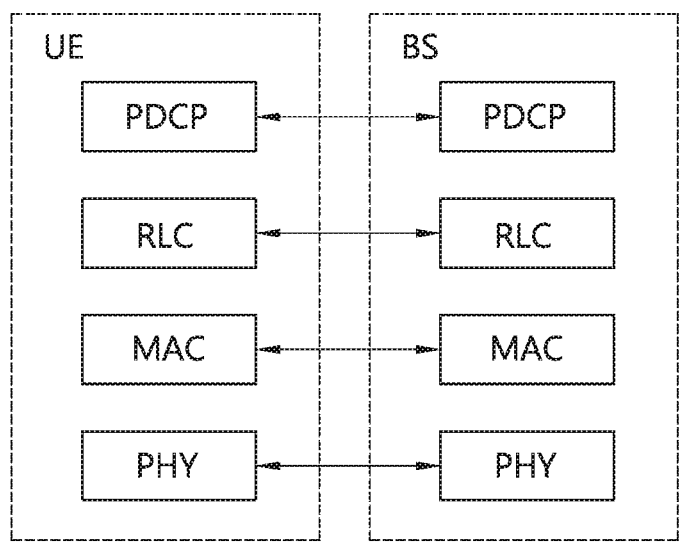
FIG. 2 is a diagram illustrating a radio protocol architecture for a user plane.
Figure 3:
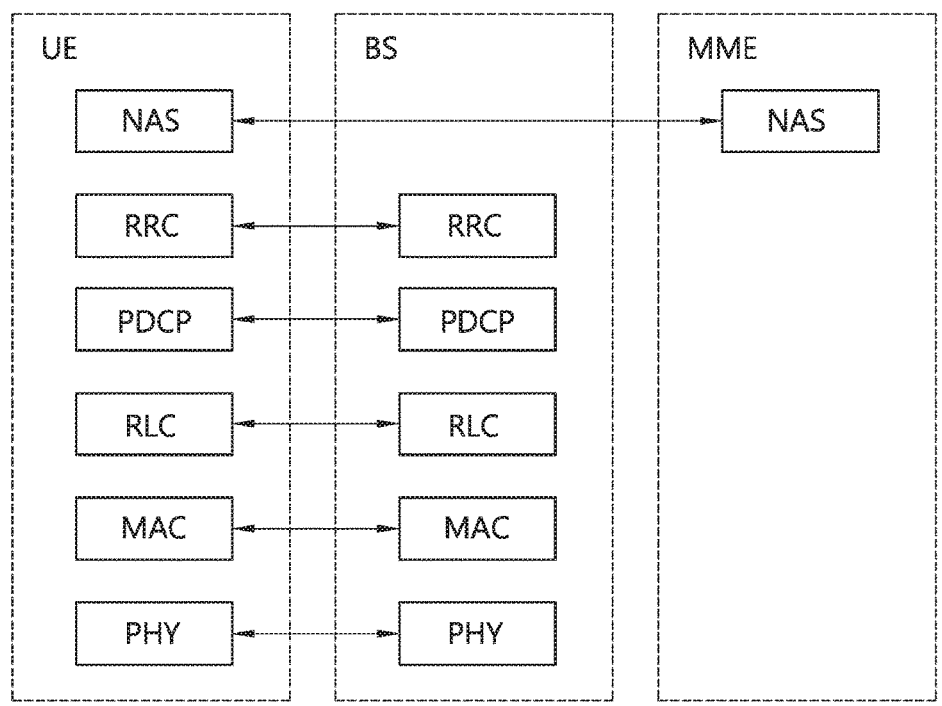
FIG. 3 is a diagram illustrating a radio protocol architecture for a control plane.

FIG. 2 is a diagram illustrating a radio protocol architecture for a user plane. FIG. 3 is a diagram illustrating a radio protocol architecture for a control plane. The user plane is a protocol stack for user data transmission. The control plane is a protocol stack for control signal transmission.

Referring to FIG. 2 and FIG. 3, a PHY layer provides an upper layer with an information transfer service through a physical channel. The PHY layer is connected to a medium access control (MAC) layer which is an upper layer of the PHY layer through a transport channel. Data is transferred between the MAC layer and the PHY layer through the transport channel. The transport channel is classified according to how and with what characteristics data is transmitted through a radio interface.

Between different PHY layers, i.e., a PHY layer of a transmitter and a PHY layer of a receiver, data are transferred through the physical channel. The physical channel is modulated using an orthogonal frequency division multiplexing (OFDM) scheme, and utilizes time and frequency as a radio resource.

A function of the MAC layer includes mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer through the logical channel.

A function of the RLC layer includes RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer in the user plane include user data delivery, header compression, and ciphering. Functions of a PDCP layer in the control plane include control-plane data delivery and ciphering/integrity protection.

A radio resource control (RRC) layer is defined only in the control plane. The RRC layer serves to control the logical channel, the transport channel, and the physical channel in association with configuration, reconfiguration and release of radio bearers (RBs).

An RB is a logical path provided by the first layer (i.e., the PHY layer) and the second layer (i.e., the MAC layer, the RLC layer, and the PDCP layer) for data delivery between the UE and the network. The configuration of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state, and otherwise the UE is in an RRC idle state.

Data is transmitted from the network to the UE through a downlink transport channel Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data are transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

Figure 4:
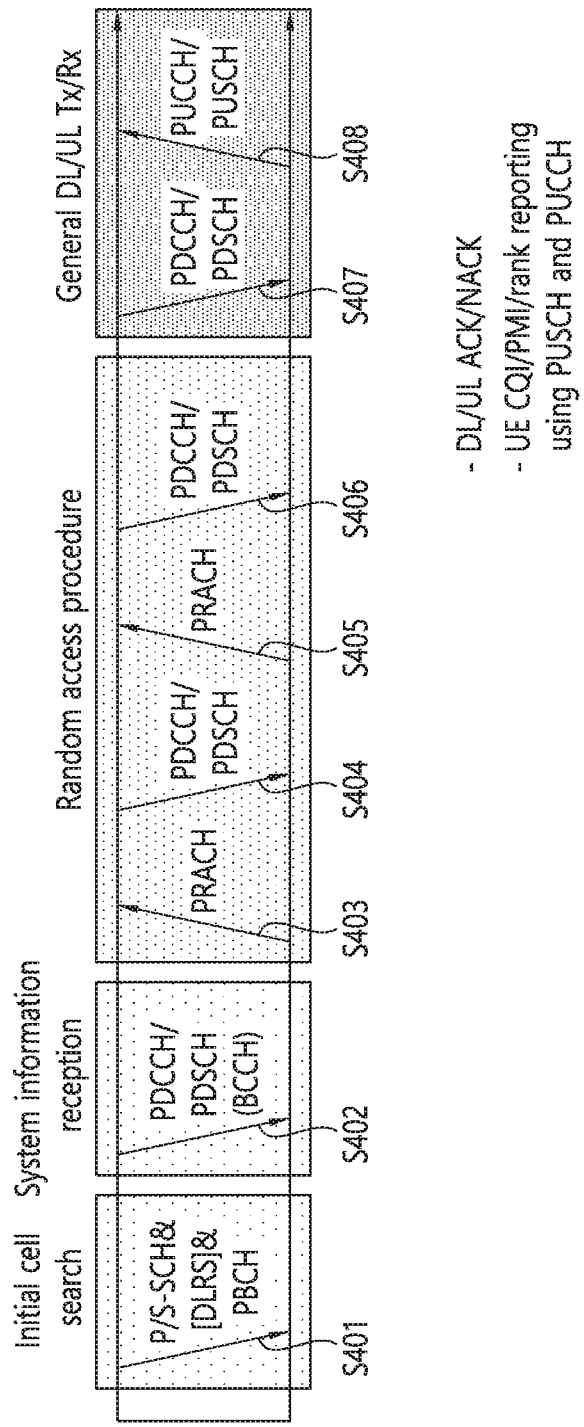
FIG. 4 is a diagram describing a physical channel and a method for transmitting signals by using the physical channel.

FIG. 4 is a diagram describing a physical channel and a method for transmitting signals by using the physical channel.

When power of a user equipment (UE) is turned on from a state in which the power of the UE was turned off, or when a UE newly enters (or accesses) a cell, the UE equipment performs an initial cell search process, such as synchronizing itself with the base station, and so on (S401). In order to do so, the UE may receive a primary synchronization channel (P-SCH) and a secondary synchronization channel (S-SCH) from the base station, thereby being capable of synchronizing itself with the base station and acquiring information, such as cell ID. Thereafter, the UE may receive a physical broadcast channel (PBCH), thereby being capable of acquiring broadcast information within the cell. Meanwhile, the UE may receive a downlink reference signal (DL RS), during the step of performing the initial cell search, so as to verify (or check) the downlink channel status.

Once the UE has completed the initial cell search, the corresponding UE may receive a PDDCH and a PDSCH, thereby being capable of acquiring more detailed system information (S402).

Meanwhile, in case the UE accesses the base station for the first time (or in case the UE performs an initial access to the base station), or in case there is no radio resource, the UE may perform a random access procedure, such as in step S403 to step S406. In order to do so, the UE may transmit a specific sequence through a PRACH as a preamble (S403), and then the UE may receive a response message respective to the random access through the PDCCH and its corresponding PDSCH (S404). In case of a contention based random access excluding the case of a handover, the UE may perform a contention resolution procedure, such as additional PRACH transmission (S405) and PDCCH/PDSCH reception (S406) that follow.

After performing the above-described procedures, the UE may perform PDCCH/PDSCH reception (S407) and PUSCH/PUCCH transmission (S408) as a general uplink/downlink signal transmission procedure. At this point, control information being transmitted to the base station via uplink or control information being received by the UE from the base station includes downlink/uplink ACK/NACK signals, a channel quality indicator (CQI), a precoding matrix index (PMI), a rank indicator (RI), and so on.

Hereinafter, a coordinated multi-point (CoMP) operation will be described in detail.

In the 3GPP LTE, the CoMP method for uplink or downlink may be broadly divided into two groups. Hereinafter, the CoMP method for downlink will only described for simplicity.

First, there is a multi-point coordination, which corresponds to a method wherein, although coordination (or adjustment), such as scheduling, link adaptation, and so on, may be performed between multiple transmission points, the transmission itself is performed from one specific transmission point. Additionally, there is also a multi-point transmission, which corresponds to a method wherein the transmission to one UE may be performed from multiple transmission point by using the CoMP method. The transmission may be dynamically performed between different transmission points by switching (or alternating) to and from one another. Alternatively, the transmission may be collectively performed from multiple transmission points.

More specifically, the multi-point coordination may coordinate the transmission from neighboring (or adjacent) transmission points in a scheduling viewpoint (whether or not to perform transmission or when to perform the transmission) or in a link adaptation viewpoint (at which rate the transmission is to be performed). However, it will be assumed that the transmission to a specific UE is still performed from only one specific transmission point.

Conversely in case of a multi-point transmission, the transmission to a specific UE may be performed from a plurality of transmission points each being different from one another. More specifically, the transmission points may be dynamically changed by using a dynamic point selection, or the transmission may be performed simultaneously from multiple transmission points by using a joint transmission method.

Hereinafter, the multi-point transmission will be described in more detail.

Figure 5:
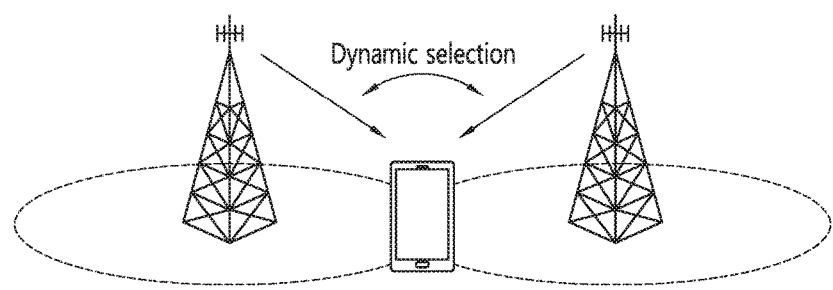
FIG. 5 is a diagram showing an example of performing a CoMP operation by using a dynamic point selection method between two transmission points.

FIG. 5 is a diagram showing an example of performing a CoMP operation by using a dynamic point selection method between two transmission points.

In the dynamic point selection method shown in FIG. 5, although the transmission is performed from a single transmission point, the corresponding transmission point may be dynamically changed.

In 3GPP LTE, all CoMP methods including the dynamic point selection method are performed based on the usage of Transmission Mode 10. Therefore, in the dynamic point selection method, channel estimation is performed through a DM-RS, and, as a result, the UE is no longer required to be informed (or aware) of the change in the transmission point. At this point, although the transmission corresponds to a simple PDSCH transmission, for the UE, when the transmission point is changed, the UE may regard such change as an abrupt change in the channel status. Essentially, for the UE, the operation may be performed identically as a case of beamforming using precoding that is not based on a codebook.

In order to assist on (or help) the dynamic point selection operation in the downlink, the UE shall provide a CSI report on the multiple transmission points. Similar to the link adaptation coordination and the scheduling coordination, the CSI report may be acquired by configuring a plurality of CSI processes in the UE.

In case of the link adaptation coordination and the scheduling coordination, CQI processes each being different from one another shall correspond to the same transmission point. In other words, a CSI-RS set should be identical for a plurality of different processors. Additionally, when making a decision on the transmission of adjacent transmission pints, different assumptions are applied so as to measure the interference. And, in order to perform the CSI report, the CSI-IM resource should vary for each of the plurality of processors.

Conversely, in order to support the dynamic point selection, different CSI processors shall respectively provide a CSI report corresponding to each of the transmission points. Therefore, the CSI-RS sets of the different processes shall be different from one another, and each of the CSI-RS sets shall correspond to different transmission points at which the dynamic point selection is being performed.

Figure 6:
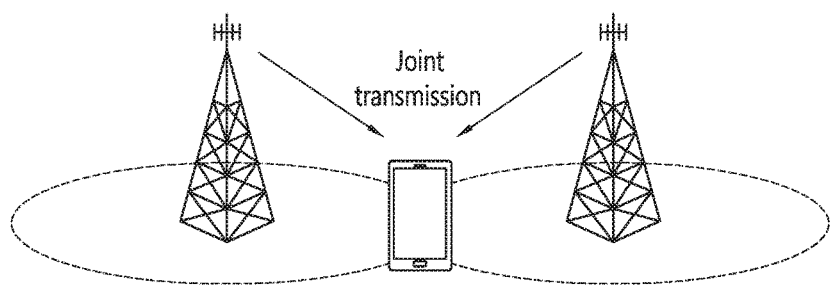
FIG. 6 is a diagram showing an example of performing a CoMP operation by using a joint transmission method between two transmission points.

FIG. 6 is a diagram showing an example of performing a CoMP operation by using a joint transmission method between two transmission points.

The joint transmission method shown in FIG. 6 represents a method wherein multiple transmission points perform transmission to the same UE at the same time. The joint transmission method may be divided into a coherent joint transmission and a non-coherent joint transmission.

In the coherent joint transmission, since the network is informed of detailed channel information from two or more transmission points, which are involved in the joint transmission, to the corresponding UE, the network may select a transmission weight (or transport weight) accordingly (e.g., the transmission weight may be selected to that the energy at the UE position can be maximized). Therefore, the coherent joint transmission may be regarded as a method wherein antennas participating in the beamforming correspond to each of the different transmission points instead of being positioned in one location.

Conversely, in the non-coherent joint transmission, it will be assumed that the network does not use the detailed channel information when performing the joint transmission. Therefore, the gain that is acquired from the non-coherent joint transmission corresponds to a power gain, which is simply obtained by adding the power of the multiple transmission points performing transmission to the UE. Such gain may vary depending upon whether or not it is more advantageous to use the power of the second transmission point when performing transmission for other UEs, or such gain may also vary depending a potential interference to another transmission that may exist in case the power of the second transmission point is additionally used in the same UE. Actually, in the non-coherent joint transmission, a gain may exist only in case the load within the network is low. This is because, in this case, another UE in which the power of the second transmission point is to be used may not exist. And, alternatively, additional interference that may occur when the power of the second transmission point is additionally used in the same UE may not cause a significant problem.

Figure 7:
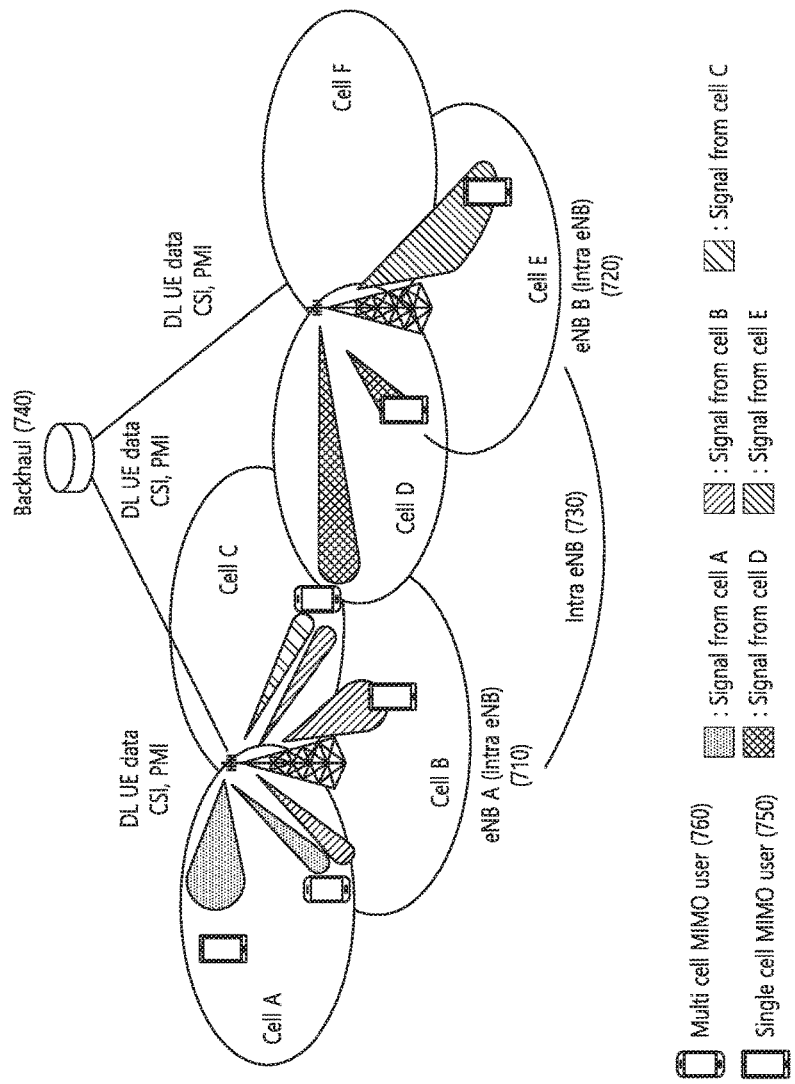
FIG. 7 is a diagram showing a procedure of performing a CoMP operation by an intra base station and an inter base station.

FIG. 7 is a diagram showing a procedure of performing a CoMP operation by an intra base station and an inter base station.

Referring to FIG. 7, intra base stations (or intra eNBs) (710, 720) and an inter base station (or inter eNB) (730) exist in a multi-cell environment. In LTE, the intra eNB is configured of a plurality of cells (or sectors). A cell that belongs to a base station (or eNB) to which a specific UE belongs is in a specific UE and an intra eNB (710, 720) relationship. In other words, a cell that shares the same eNB as a cell to which the UE belongs is referred to as a cell that corresponds to the intra eNB (710, 720), and a cell that belongs to another eNB is referred to as a cell that corresponds to the inter eNB (730). As described above, a cell that is based on a specific UE and the same base station (eNB) receives and transmits information (e.g., data, channel state information (CSI)) through an X2 interface, and so on. However, a cell that is based on another base station (eNB) may receive and transmit inter-cell information through a backhaul (740), and so on.

As shown in FIG. 7, a single cell MIMO user (750) existing within a single cell may perform communication with one serving base station in one cell (sector), and a multi-cell MIMO user (760) being positioned at a cell boundary may perform communication with multiple serving base stations within a multi-cell (sector).

Generally, under a multi-cell environment, when a method performing CoMP operations is used, the communication capability (or performance) of a cell boundary UE may be enhanced. Such method performing CoMP operations includes a Joint Processing (JP) method, which is configured of a coordinated MIMO format via data sharing, a Coordinated Scheduling/Coordinated Beamforming (CS/CB) method for reducing inter-cell interference, and so on. The Coordinated Scheduling/Coordinated Beamforming (CS/CB) method includes a worst companion method and a best companion method. Herein, the worst companion method corresponds to a method for eliminating (or cancelling) interference, wherein the UE performing CoMP operations reports a PMI having the largest interference on the cells, which perform the CoMP operations, to the serving base station, thereby allowing the corresponding cells to use a second (or next) best PMI excluding the reported PMI. And, the best companion method corresponds to a method for reducing inter-cell interference, wherein the UE performing CoMP operations reports a PMI having the smallest interference on the cells, which perform the CoMP operations, thereby allowing the inter-cell interference to be reduced by having the corresponding cells use the reported PMI.

As described above, the communication method performing CoMP operations is proposed in order to reduce inter-cell interference in a multi-cell environment and to enhance the capability of UEs positioned at cell boundaries. In order to do so, accurate channel estimation is required to be carried out based on reference signals received from multiple base stations. Most particularly, in case of using the method of performing CoMP operations, in order to allow the Coordinated Scheduling/Coordinated Beamforming (CS/CB) method as well as the Joint Processing (JP) method to be performed smoothly by a single feedback transmission, the UE is required to transmit signal intensity of a serving cell, signal intensity of a neighbor cell belonging to a group (or set) of cells performing CoMP operations, and intensity of noise and interference being generated from a cell other than the group (or set) of cells performing CoMP operations to the serving base station, and so on.

A cell boundary UE that performs the operations for performing the CoMP operations is required to transmit feedback information, which is needed to easily carry out the method for performing all CoMP operations (e.g., the Joint Processing (JP) method, the Coordinated Scheduling/Coordinated Beamforming (CS/CB) method, and so on) to the serving base station. When the UE transmits such feedback information, the overhead according to the complicated signaling may be reduced, and the UE and each cell performing the CoMP operations may be capable of efficiently performing diverse CoMP operations. In order to support this, the UE measures a CQI value between multiple cells and may send feedback related to the measured value to the serving base station, and so on.

The UE performing the CoMP operations may measure adequate CQI values corresponding not only to the serving cell performing the CoMP operations but also to the neighbor cells providing interference or preferable signals. And, then, the UE may send feedback on the measured values. Based on such CQI values, the serving base station may carry out a method for performing diverse CoMP operations. For this, the UE is required to measure the signal intensity of a serving cell, the signal intensity of a neighbor cell belonging to a group (or set) of cells performing CoMP operations, and the intensity of noise and interference being generated from a cell other than the group (or set) of cells performing CoMP operations and then transmit the measured values to the serving base station. If the UE is capable of measuring such values and sending feedback on such values to the serving base station, the serving base station may accurately calculate the CQI values not only for Coordinated Scheduling/Coordinated Beamforming (CS/CB) method but also for the Joint Processing (JP) method and may then perform optimal transmission.

The current cellular system is evolving from the fourth generation (4G) to the fifth generation (5G). In the usage of the 5$^{th}$ generation communication, in addition to the evolution of the legacy smartphone-based mobile broadband services, requirements for supporting diverse Internet of Things (IoT) application services, such as healthcare, disaster management, vehicle communication, factory management, robot control, and so on, are being defined. In supporting the IoT application services, the issue of transmitting highly reliable data within a short period of time is becoming more important than the data rate, which was considered to be very important in the legacy communication system. Such type of service is referred to as an Ultra-Reliable Low Latency Communication (URLLC) in the 3GPP.

Hereinafter, the manifold transmission will be described in detail. The manifold transmission method corresponds to a method that maximizes the number of transmission sessions and diversity within a limited time by using multiple paths. The manifold transmission may also be referred to as a multi-path transmission or a manifold transmission. Hereinafter, the above-mentioned terms will be alternately used for describing the manifold transmission (or multiple transmission).

Figure 8:
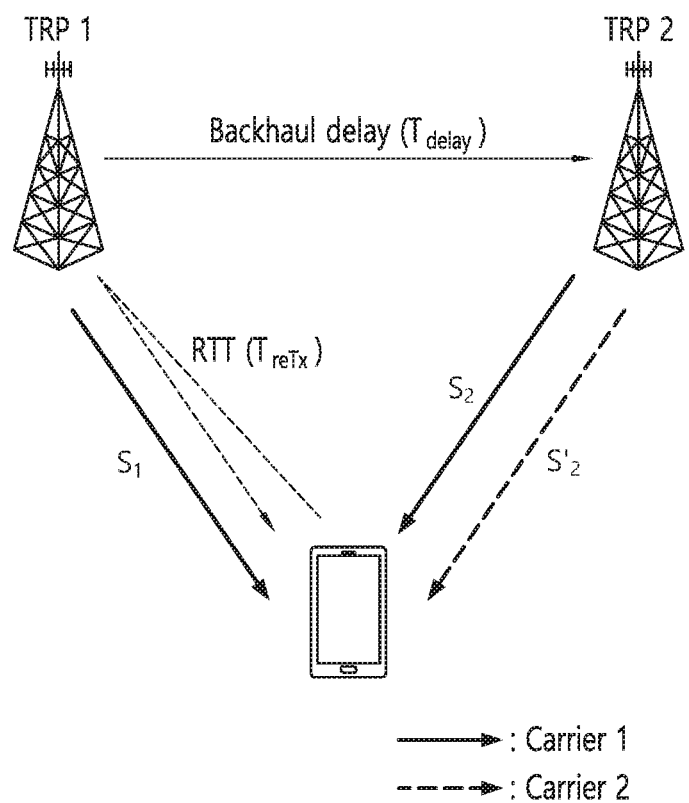
FIG. 8 is a diagram showing a comparison between a manifold transmission method and a CoMP operation according to an exemplary embodiment of this specification.

FIG. 8 is a diagram showing a comparison between a manifold transmission method and a CoMP operation according to an exemplary embodiment of this specification.

When the manifold transmission method of FIG. 8 is used, it is advantageous in that the transmission is more robust against backhaul delay (or latency) as compared to the legacy CoMP method, and that a larger number of transmission sessions can be performed within a limited time. In the next generation wireless communication system, the manifold transmission method uses a two level DCI. When performing physical layer scheduling, in the conventional method, the scheduling process was performed in a single level (or phase), which is configured of PDCCH, and so on, whereas, in the manifold transmission method, the two level DCI attempts to perform scheduling by using level 1 DCI and level 2 DCI, respectively. More specifically, in level 1 DCI, scheduling is performed for a manifold transmission activation indicator, and, in level 2 DCI, each TRP performs scheduling for the data (packet).

Additionally, in the legacy CoMP method, TRP 1 and TRP 2 perform scheduling after establishing coordination, whereas, in the manifold transmission method, TRP 1 and TRP 2 may perform scheduling freely. In case of the UE, the UE receives signal $S_1$, which is transmitted from TRP 1, and receives signal $S_2$, which is transmitted from TRP 2, as a retransmitted signal. In FIG. 8, Sx corresponds to a signal that is transmitted from TRP x and generated from the same information.

Table 1 shown below represents a comparison between signals being transmission by using the manifold transmission method and the legacy CoMP method within a limited time.

TABLE 1

| | Time | | | | |
|---|---|---|---|---|---|
| | t | t + $T_{delay}$ | t + $T_{reTx}$ | t + $T_{delay}$ + $T_{reTx}$ | t + 2$T_{delay}$ + $T_{reTx}$ |
| CoMP JT case 1 | $S_1$, $S_2$ | | | $S_1$ or $S_2$ | |
| CoMP JT case 2 | $S_1$, $S_2$ | | | | $S_1$, $S_2$ |
| Manifold Tx | $S_1$ | $S_2$ and/or $S'_2$ | $S_1$ | $S_2$ and/or $S'_2$ | |

In order to differentiate the signals, in Table 1, $S_1$ and $S_2$ represent signals being transmitted from Carrier 1, and $S'_2$ represents a signal being transmitted from Carrier 2.

Referring to Table 1, in the manifold transmission method, since the signal being transmitted equally corresponds to $S_1$ for both of a case where the limited time is equal to t and a case where the limited time is equal to t+$T_{reTx}$, it will be apparent that the transmission is not influenced by the backhaul delay (or latency). Additionally, in the manifold transmission method, since the signal being transmitted equally corresponds to $S_2$ and/or $S'_2$ for both of a case where the limited time is equal to t+$T_{delay}$ and a case where the limited time is equal to t+$T_{delay}$+$T_{reTx}$, it will be apparent that replicated transmission is possible in another TRP or another numerology or another carrier or another Radio Access Technology (RAT).

Although this specification is described by using a transmission and reception point (TRP), this specification will not be limited only to this. And, therefore, this specification may also be applied to any other similar device (or apparatus). For example, it will be possible to replace the TRP of this specification with a cell, a base station (eNB), a transmission point, an access point (AP), a radio unit, and so on.

In this specification, the UE may receive signals from a primary TRP and one or more secondary TRPs, and, for this, the primary TRP and the secondary TRP(s) are in a synchronized state. The primary TRP and the secondary TRP may use the same carrier or may each use a different carrier. Alternatively, the primary TRP and the secondary TRP may each correspond to a different RAT or may each have a different numerology. In case each of the primary TRP and the secondary TRP uses a different carrier, the primary TRP and the secondary TRP may physically correspond to the same device (or apparatus).

A numerology may correspond to diverse numeric values that can be used in a next generation communication system, which is used for the purpose of high reliability and low latency (or delay). For example, a numerology may correspond to a length of a subframe (TTI length), subcarrier spacing, a number of symbols in a subframe, and/or a CP length, and so on.

Hereinafter, a manifold transmission method for maximizing a packet transmission likelihood within a target time in order to perform high-reliability communication will be proposed. More specifically, a signaling method for implementing the manifold transmission method will be proposed.

Figure 9:
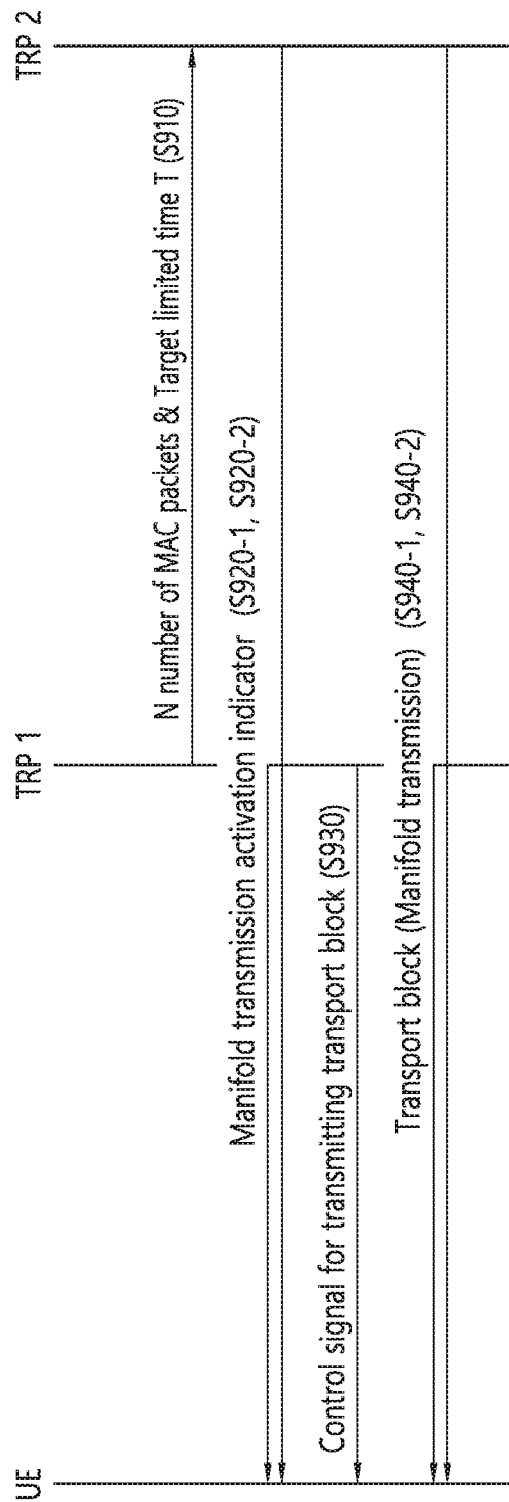
FIG. 9 shows an example of performing manifold transmission by using a manifold transmission activation indicator according to an exemplary embodiment of this specification.

FIG. 9 shows an example of performing manifold transmission by using a manifold transmission activation indicator according to an exemplary embodiment of this specification. FIG. 9 shows an example of a manifold transmission procedure of the Proposed Technique 1, which will hereinafter be described in detail. TRP 1 of FIG. 9 may correspond to a primary TRP, and TRP 2 of FIG. 9 may correspond to a secondary TRP. TRP 1 and TRP 2 may belong to a TRP group applying the manifold transmission method.

—Proposed Technique 1—

For example, when the primary TRP receives a higher layer packet (e.g., IP packet) requesting a high reliability service, the primary TRP divides the received packet to N number of MAC packets (or transport blocks). Herein, N is an integer equal to or greater than 1. Thereafter, the primary TRP delivers the divided N number of MAC packets and target transmission (or transport) time T to a secondary TRP (S910). Additionally, the primary TRP indicates to the UE that the manifold transmission for the N number of MAC packets is activated until time T (S920-1).

This exemplary embodiment assumes a case where the UE is capable of receiving signals of the primary TRP and the secondary TRPs. Therefore, the exemplary embodiment is adequate for a case where the UE includes multiple radio units (RUs) that are different from one another, or a case where the UE receives signals by using multiple carriers or multiple RATs each being different from one another. Additionally, the manifold transmission refers to a type of transmission wherein each of the primary TRP and the secondary TRPs attempts to perform transmission to the UE.

Unlike in the legacy CoMP method, in the manifold transmission method, each TRP may respectively transmit a signal without establishing any cooperation between the TRPs within the TRP group. More specifically, if the primary TRP provides only the information on the number of transport blocks (or MAC packets) and the information on the time during which the manifold transmission can be performed, each of the primary TRP and the secondary TRPs may transmit a transport block to the UE without establishing any cooperation between one another. The UE may receive each of the transport blocks respectively transmitted from each of the primary TRP and the second TRPs as though the corresponding transport blocks have been retransmitted. Accordingly, the UE requires a retransmission process IP (PCID).

This exemplary embodiment will not be limited in that, when the primary TRP generates the N number of MAC packets, the primary TRP multiplexes multiple different services. Additionally, since the target transport time T varies for each service, the target transport time is required to be notified (or announced) each time the IP packet is changed. Since the backhaul delay (or latency) may vary for each secondary TRP, the time T is notified in the form of an absolute time, such as a subframe index.

An exemplary embodiment of a manifold transmission activation indicator is as described below. A first case corresponds to a case where each UE separately receives a Cyclic Redundancy Check (CRC) for the manifold transmission activation indicator. At this point, the information on the manifold transmission activation indicator is configured of time information T on the time when the manifold transmission is expired and the number of MAC packets (or transport blocks) applying the manifold transmission. A second case corresponds to a case where each UE shares a control signal and a CRC for the reception of a transport block. At this point, in addition to the above-described 2 types of information, the information on the manifold transmission activation indicator further includes a manifold transmission activation indicator, which corresponds to a 1-bit information.

Additionally, the manifold transmission activation indicator includes control signal information of a transport block for the transmission of a first MAC packet. Herein, the control signal information includes resource allocation information, MCS, a multi-antenna transmission method, a New Data Indicator (NDI), a Process ID, and so on.

In order to carry out the data transmission within the target time T as quickly as possible, it will be appropriate to transmit the manifold transmission activation indicator and to initiate (or start) the transmission of the first MAC packet at the same time. If the manifold transmission activation information is included in the physical layer control signal for the transmission of the transport block, the CRC overhead of the control signal may be reduced and a coding gain may be increased due to an increase in the codeword length.

The above-described example is disadvantageous in that, in a situation where the manifold transmission is not activated, the UE is required to perform blind decoding for two physical layer control signals each having a different length and that the UE is incapable of combining and decoding the manifold transmission activation indicators received from different TRPs.

Also, in addition to the primary TRP, the secondary TRPs also deliver (or transmit) manifold transmission activation indicator information notifying (or announcing) the initiation of the manifold transmission (S920-2). If the UE fails to receive the manifold transmission activation indicator, the UE is incapable of receiving the N number of MAC packets from the secondary TRPs. For this, the delivery of the manifold transmission activation indicator is very important. Therefore, by delivering the manifold transmission activation indicator information, which notifies (or announces) the initiation of the manifold transmission, the reliability of the signal may be enhanced.

Additionally, the primary TRP separately transmits the manifold transmission activation indicator and the control signal for the transmission of a transport block (S930). Moreover, the primary TRP may transmit the manifold transmission activation indicator N number of times, and the number of repeated transmission sessions may be varied in accordance with the channel status. Herein, N is an integer being equal to or greater than 1.

Each TRP may use the repeated transmission in order to enhance the reliability of the manifold transmission activation indicator. In order to perform the repeated transmission, the control signal for the transmission of a transport block should be separated so as to remove unnecessary overhead.

Additionally, in order to allow the UE to easily combine and decode the repeatedly transmitted manifold transmission activation indicator, the TRP announces (or notifies) the number of repeated transmission sessions N and the interval to the UE through L2/L3 signals. Moreover, the TRP may repeatedly transmit the manifold transmission activation indicator from the same resource as the first transmission resource.

If the number of repeated transmission sessions is known, it will be easier for the UE to combine the manifold transmission activation indicator within a specific window. For example, in case the repeated transmission interval corresponds to each subframe and the number of repeated transmission sessions is equal to N, the UE may receive the manifold transmission activation indicator by using a window having the length of N number of subframes.

Additionally, when performing the repeated transmission of the manifold transmission activation indicator, by allowing the transmission to be performed only from the resource from which the manifold transmission activation indicator was first transmitted, the number of candidates used for performing combination for the decoding process may be reduced. If the transmission position of the manifold transmission activation indicator changes each time a transmission is performed, the group of candidates may become too large. In this case, it will be difficult to combine the candidates in order to perform decoding.

Also, for the UEs in which the manifold transmission is deactivated, the corresponding UEs searches for both the manifold transmission activation indicator and the control signal from the physical control channel. For the UEs in which the manifold transmission is activated, the corresponding UEs only the physical control channel for the transmission of a transport block. Since it is difficult for the manifold transmission to carry out two different operations at the same time, in order to reduce the overhead of the UE, the UE having the manifold transmission activated may be configured to not perform decoding of the manifold transmission activation indicator.

Also, in addition to the primary TRP, the secondary TRPs also deliver (or transmit) manifold transmission activation indicator information notifying (or announcing) the initiation of the manifold transmission by using the same method (S920-2). The number of repeated transmission sessions for transmitting the manifold transmission activation indicator performed by the secondary TRPs may be randomly determined by each secondary TRP in accordance with the channel status, or the primary TRP may request a minimum number of transmission sessions to the secondary TRPs. In order to enhance the reliability of the manifold transmission activation indicator, the secondary TRPs may also be configured to transmit the activation indicator. However, in this case, it will be disadvantageous in that the overhead of the UE may be increased.

Additionally, the manifold transmission activation indicator and the control signal for the transmission of a transport block may be configured to have the same length. In case the repeated transmission of the manifold transmission activation indicator is configured, for the control signals having the same length, the UE attempts to perform decoding of one control signal without combining the signal with its previous signal, and the UE attempts to perform decoding of another control signal after combining the signal with its previous N−1 number of signals.

The signal that is decoded without being combined with its previous signal by the UE may correspond to a manifold transmission activation indicator or a control signal for the transmission of a transport block. Conversely, the signal that is decoded after being combined with its previous signals by the UE corresponds to the manifold transmission activation indicator. This is because, since the control signal for the transmission of a transport block is not repeated, its reception capability is degraded due to additional interference that occurs during the combination process.

Additionally, the manifold transmission activation indicator being transmitted by each TRP is configured of the same information, so that the activation indicators being respectively received from the different TRPs can be combined and then decoded. For this, the time T is notified in the form of an absolute time (e.g., subframe index), and so on. Moreover, the positions where each of the TRPs transmits the manifold transmission activation indicator may be unified, or an agreement may be established in advance so that the transmission positions of the secondary TRPs can be determined in accordance with the transmission point of the primary TRP.

This exemplary embodiment is advantageous in that the combination process enhances the reliability level of the manifold transmission activation indicator. However, this exemplary embodiment is disadvantageous in that the complexity level of the UE may be increased in order to carry out the combination process. Therefore, in order to minimize such disadvantage, the transmission positions of the manifold transmission activation indicator being respectively transmitted by the different TRPs need to be unified.

Additionally, each TRP independently transmits the control signal. Each TRP may adjust the resources that are to be transmitted and the resource size while satisfying the condition of transmitting all of the given MAC packets within time T. Also, by adjusting the resource size, the Modulation and Coding Scheme (MAC) level is adjusted.

Apart from the condition of transmitting the MAC packets within time T, each TRP may freely transmit the MAC packets. By doing so, the level of scheduling freedom of each TRP may be enhanced, and this leads to an increase in resource usability. Also, since the retransmission may be performed by each TRP, it is advantageous in that the retransmission rate (or speed) can be increased.

Additionally, the secondary TRP delivers long cycle channel information to the primary TRP, and the primary TRP uses the long cycle channel information so as to generate N number of MAC packets. When the primary TRP generates the N number of MAC packets from a higher layer packet (IP packet), each TRP transmits one MAC packet by inserting the MAC packet in one transport block. Generally, since the channel status is considered when configuring the size of the transport block, when the primary TRP generates the N number of MAC packets, the channel information of the secondary TRPs is needed. However, since the reception channel information varies as the time elapses, the MAC packets need to be generated by using the long cycle channel information. Each TRP may overcome the difference between a long cycle channel information and an instantaneous channel information by freely changing (or varying) the MCS level.

Additionally, in addition to the long cycle channel information, the secondary TRP may also notify the primary TRP of the minimum resource size that can be ensured by the secondary TRP. By generating the MAC packets based on the minimum resource size that can be ensured by the secondary TRP, the primary TRP may guarantee the level of reliability of the signal.

Moreover, when generating the MAC packets, the primary TRP may notify (or announce) a minimum Block Error Rate (BLER) value that should be ensured by each TRP. The secondary TRPs that have received this value may perform scheduling of the MAC packets based on the minimum BLER.

Additionally, the UE establishes an agreement in advance on an information bit length, a code rate, and a parity bit generation order of a mother code, so that the UE can combine the signals of the primary TRP and the secondary TRPs and then perform data decoding. Also, the primary TRP notifies (or announces) the corresponding information to the UE via L2/L3 signaling.

When the UE decodes the data, in order to calculate a Log Likelihood Ratio (LLR) by combining signals that are different from one another, the information bit length and the coding rate of the mother code, which is used when transmitting signals, should be equal to one another. Moreover, in an Incremental Redundancy (IR) method, wherein each TRP transmits a different parity bit, the UE needs to know the types of parity bits that are transmitted by each TRP in order to generate the LLR value.

The parity bit generation order of each TRP is applied in accordance with the TRP ID. When the primary TRP notifies the ID of each TRP within the TRP group, the UE determines the parity bit generation order of each TRP by using the notified ID. In case the TRP groups performing the manifold transmission are configured to transmit different parity bits, the type of parity bit generated by each TRP may be mapped to the ID of the TRPs within the TRP group.

Moreover, in addition to the parity bit generation order of each TRP, the code rate that is applied when transmitting a transport block may also be determined. When applying the above-described method (or technique), each TRP may freely select a symbol modulation method in accordance with the channel status. The UE decodes a symbol and then adds the LLR values generated from each TRP and then performs decoding. When applying this exemplary embodiment, it is advantageous in that pre-adjustments, such as mapping the parity bit types to the TRP IDs while ensuring the level of scheduling freedom of each TRP to a predetermined level, are not required to be made.

Furthermore, the N number of packets are assigned with process IDs that are to be used when mapping the transport block. The process ID information is shared by the primary TRP and the secondary TRPs, and the process ID information is included in the physical layer control signal for the transmission of a transport block and then transmitted each time a transport block is transmitted. The assigned process ID is valid until time T and then expires afterwards. Alternatively, the assigned process ID is expired when a New Data Indicator (NDI) is triggered to the corresponding process ID.

In order to combine the transport blocks that are received from each of the different TRPs, the UE should know that each transport block corresponds to the same information. For this, a signal indicating that the transport blocks are configured of the same MAC packet is needed. In the legacy system, the transport blocks correspond to the same information by using a retransmission process ID. By using this method, a process of sharing the same process ID within the TRP group is performed.

Thereafter, since the UE that has received the manifold transmission activation indicator initiates a monitoring process for monitoring the TRPs belonging to the TRP group, to which the manifold transmission method can be applied, and the carriers, additional information for the manifold transmission may be received through diverse paths. Therefore, the UE may receive transport blocks applying the multiple transmission (manifold transmission) method from TRP 1 and TRP 2 (S940-1, S940-2).

—Proposed Technique 2—

As another example, in addition to the Proposed Technique 1, the primary TRP and the secondary TRPs transmit signals only within a pre-defined transport duration (or section). Information on the transport duration is delivered by the primary TRP to the UE through L2/L3 signals.

In this exemplary embodiment, a case where the UE may alternately receive the signals transmitted from the primary TRP and the secondary TRPs will be assumed. Therefore, this exemplary embodiment shall be appropriate for a case where the UE has a single RU or radio frequency (RF). In case the UE receives a signal from one TRP at a time, the TRP from which the UE currently attempts to receive a signal and the TRP to which a MAC packet is transmitted after being mapped to a transport block should be coherent. For this, the transport duration of each TRP should be pre-determined in advance, and the predetermined (or pre-defined) transport duration should be notified to the UE. Each TRP (base station) may freely perform scheduling within the transport duration. More specifically, during a signal transport section, the MAC packet may not be transmitted or two MAC packets may be transmitted.

For example, a case where the transport duration of TRP n is F_n and a total of n number of TRPs transmit signals to the UE will be assumed. Herein, n is an integer ranging from 1 to N. The transport duration of each TRP is serially positioned starting from TRP 1 to TRP N. Finally, when the transport duration of TRP N is positioned, this transport duration is then followed by the transmission duration of TRP 1.

Furthermore, the lower-level techniques (or methods) that are described in the Proposed Technique 1 may also be applied in the Proposed Technique 2.

—Proposed Technique 3—

As another example, the UE that has received the manifold transmission activation indicator acknowledges that the manifold transmission is activated for a period of time T, and, then, the UE initiates reception of the signals transmitted from the TRPs belonging to the TRP group performing the manifold transmission.

Even if the UE is configured to be connected to multiple TRPs, in order to reduce the power consumption of the UE, only the signals of the TRPs in which data transmission and reception are actually being performed need to be received. By allowing the manifold transmission activation indicator to indicate (or instruct) the UE to receive signals from the multiple TRPS, the UEs that have not received the manifold transmission activation indicator may avoid performing the operation of receiving signals from redundant (or unnecessary) TRPs.

Additionally, if the UE does not receive a new manifold transmission activation indicator at a time point where time T is completed, the UE completes the manifold transmission. This indicates that the UE performs decoding after receiving only the signal from the primary TRP. This corresponds to a technique (or method) of completing (or ending) a manifold transmission without any additional signaling. This technique is advantageous in that signaling for deactivating the manifold transmission is not required. However, this technique is also disadvantageous in that the manifold transmission activation indicator is required to be transmitted each time a new higher layer packet is received (or reached).

Additionally, information on a time point T_exp being expired other than time T is transmitted by the base station to the UE along with the manifold transmission activation indicator. T_exp is longer than or equal to T. While the manifold transmission activation indicator is transmitted, a time during which the manifold transmission is deactivated is separately designated. In this case, the time T refers to a time point at which the process ID (PCID) for each of the N number of MAC packets is expired, and T_exp indicates the time when the manifold transmission is expired.

If the above-described technique is applied, the UE may be capable of receiving signals from different TRPs even at a time point at which the reception of the N number of MAC packets is completed after the elapse of time T. Therefore, it will be advantageous in that the UE can receive control signal information (e.g., PCID mapping information) on a new N number of MAC packets through diverse paths.

Unlike the above-described technique (or method), if time T is completed, the process ID that is used for the manifold transmission is expired and the manifold transmission may not be expired. The manifold transmission becomes deactivated when a deactivation indicator is received. If this technique (or method) is applied, it will be advantageous in that the UE can receive control information on the new N number of MAC packets from the diverse paths.

Furthermore, a specific field of the manifold transmission activation indicator indicates the activation and deactivation of the manifold transmission. For example, if the foremost bit of the manifold transmission activation indicator is equal to 1, this may indicate the activation of the manifold transmission. And, if the foremost bit is equal to 0, this may indicate the deactivation of the manifold transmission.

—Proposed Technique 4—

Figure 10:
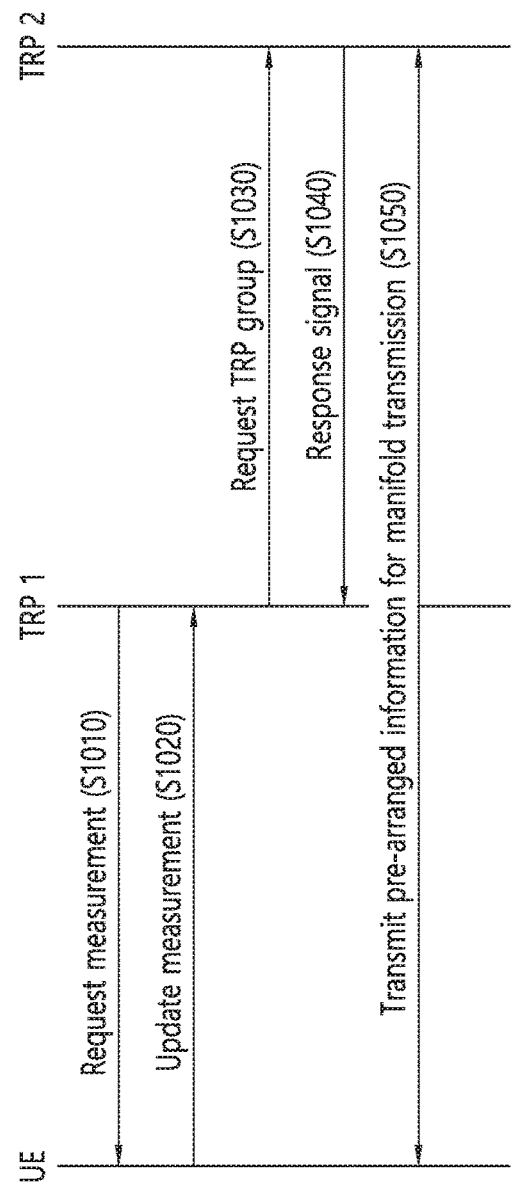
FIG. 10 is a diagram showing a procedure for updating a TRP group for a manifold transmission according to an exemplary embodiment of this specification.

FIG. 10 is a diagram showing a procedure for updating a TRP group for a manifold transmission according to an exemplary embodiment of this specification.

As another example, an updating process of the TRP group for the manifold transmission is as described below. The primary TRP requests in advance the UE to update the channel quality value of the neighboring TRPs. The primary TRP uses the channel quality value of the TRP, which is updated by the UE, so as to configure a TRP group for the manifold transmission. Thereafter, the primary TRP transmits identification information of the TRP belonging to the TRP group to the UE via L2/L3 signaling. The L2/L3 signaling may be transmitted to the UE at the same time as the control signal, which can be independently transmitted by each TRP in the Proposed Technique 1.

Referring to FIG. 10, a detailed updating procedure of the TRP group for the manifold transmission is illustrated. Firstly, TRP 1, which corresponds to the primary TRP, requests for the channel quality of the neighboring (or surrounding) TRPs to be measured and transmitted (S1010). At this point, TRP 1 may request the UE to transmit only the channel quality information for the higher n number of TRPs. Also, after measuring the channel of the neighboring TRPs, the UE transmits the identification information (e.g., Physical cell ID) and the channel quality value of the higher number of TRPs to TRP 1 (S1020). After receiving the given information, TRP 1 requests some of the TRPs, among the n number of TRPs, to be included in the TRP group for the manifold transmission (S1030). The TRP that has received the TRP group request signal (shown only as TRP 2 in FIG. 10) determines whether or not it is capable of accepting the request and transmits a respective response to TRP 1 (S1040). At this point, each TRP may transmit the response along with the long cycle channel information of the Proposed Technique 1. After receiving the response from the TRPs (the other TRPS apart from TRP 2 are not shown in FIG. 10), TRP 1 performs a final selection of the TRPs that will be configuring the TRP group and then announces that TRP 2 is included in the TRP group for the manifold transmission (S1050). Accordingly, a parity generation order (redundancy version), a code rate and a bit length of the mother code, which are used by each TRP while performing the manifold transmission, are notified to each TRP along with the corresponding response. Furthermore, the updated TRP group information is transmitted to the UE.

Figure 11:
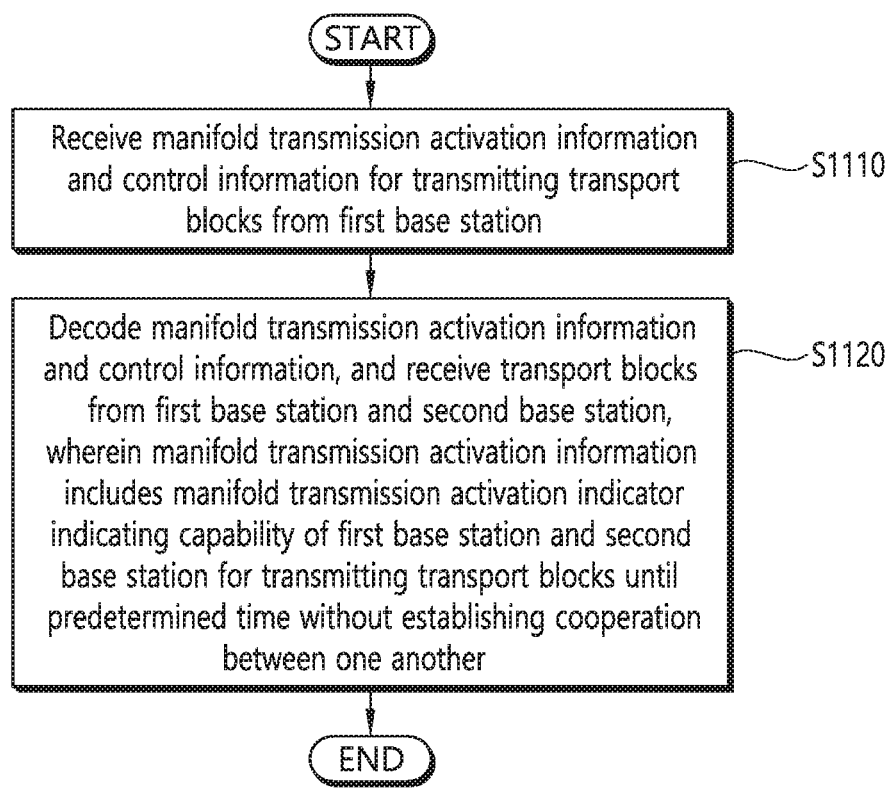
FIG. 11 is a flow chart showing a procedure for receiving a signal performed by a wireless communication system applying a manifold transmission technique according to an exemplary embodiment of the present invention.

FIG. 11 is a flow chart showing a procedure for receiving a signal performed by a wireless communication system applying a manifold transmission technique according to an exemplary embodiment of the present invention.

The terms will first be described. A manifold transmission (or multiple transmission) method (or technique) refers to a technique for maximizing the number of signal transmission sessions and diversity within a limited time by using multiple paths. The manifold transmission may also be referred to multi-path transmission or manifold transmission. A first base station may correspond to the primary TRP, and a second base station may correspond to the secondary TRP.

Firstly, in step S1110, the UE receives manifold transmission activation information and control information for transmitting a transport block from the first base station. The manifold transmission activation information includes a manifold transmission activation indicator indicating that the first base station and the second base station are capable of transmitting the transport block until a predetermined time without establishing any cooperation between one another. More specifically, the first base station indicates to the UE that the manifold transmission for the transport block is activated until a specific time.

Additionally, the manifold transmission method may use two level DCI. Herein, the manifold transmission activation information may be delivered by using level 1 DCI, and control information (scheduling information) for the transmission of a transport block may be delivered by using level 2 DCI. Herein, the level 1 DCI and the level 2 DCI may be transmitted from the same control channel of a subframe or a slot or a mini-slot. Alternatively, the level 1 DCI and the level 2 DCI may be transmitted from a control channel of different subframes or slots or mini-slots. Alternatively, the level 1 DCI may be transmitted from a control channel of a subframe or a slot or a mini-slot, and the level 2 DCI may be transmitted from a data channel of a subframe or a slot or a mini-slot.

In step S1120, the UE decodes the manifold transmission activation information and the control information and then receives the transport block from the first base station and the second base station. More specifically, the UE may use a path between the UE and the first base station and a path between the UE and the second base station, thereby being capable of receiving signals that are transmitted from the first base station and the second base station within a limited time through multiple paths.

Additionally, the UE may also receive the manifold transmission activation information from the second base station. In addition to the first base station, since the UE also receives a transport block from the second base station as well, the activation information notifying (or announcing) the initiation of the manifold transmission may also be delivered from the second base station, thereby enhancing the reliability level of the signal. Moreover, the manifold transmission activation information may further include the predetermined time and a number of the transport blocks.

Additionally, the manifold transmission activation information may be repeatedly received from the same resource. The UE may combine the repeatedly received manifold transmission activation information and may then decode the combined information. At this point, the manifold transmission activation information may be configured to have the same bit length as the control information.

Additionally, the manifold transmission activation information received from the first base station and the manifold transmission activation information received from the second base station may be configured of the same information. The manifold transmission activation information received from the first base station and the manifold transmission activation information received from the second base station may be received by the same resource. Although the reliability level may be enhanced by combining and decoding the manifold transmission activation information, this may be disadvantageous in that the level of complexity in the UE may be increased. As described above, the length of the information and the position of the transmission resource are unified in order to minimize such disadvantage.

Additionally, the UE may combine the transport blocks received from the first base station and the second base station and may then decode the combined transport blocks. At this point, the transport blocks, which are received from the first base station and the second base station, may be transmitted by using a bit length of a mother code used by the first base station and the second base station, a code rate of the mother code, and a parity bit generation order. The bit length of the mother code, which is used by the first base station and the second base station, and the code rate of the mother code may be configured to be equal to one another. And, the parity bit generation order of the first base station and the second base station may be determined in accordance with an identifier of the first base station and an identifier of the second base station.

In order to allow the UE to combine and decode different signals, the first base station may signal the bit length of the mother code, the code rate of the mother code, and the parity bit generation order, which are pre-arranged between the first base station and the second base station, to the UE. Thus, the UE may be capable of combining the transport blocks, which are received from the first base station and the second base station, and easily decoding the combined transport blocks.

Additionally, the control signal information includes resource allocation information, MCS, a multi-antenna transmission method, a New Data Indicator (NDI), a Process ID, and so on.

The process ID may be mapped to the transport blocks that are received from the first base station and the second base station. The process ID information is shared by the primary TRP and the secondary TRPs, and the process ID information is included in the control information for the transmission of a transport block and then transmitted each time a transport block is transmitted.

The process ID may be expired after the predetermined time or in case the NDI is triggered. If time still remains before the expiration of the process ID, the transport blocks received from the first base station and the second base station may be combined and then decoded. However, if the process ID is already expired, the transport blocks received from the first base station and the second base station may each be decoded without being combined, or only the transport block received from the first base station may be decoded. More specifically, in case the expiration of the process ID does not correspond to the expiration of the manifold transmission, the transport blocks received from the first base station and the second base station may each be separately decoded without being combined. However, if the expiration of the process ID is also regarded as the expiration of the manifold transmission, only the transport block received from the first base station may be decoded.

Furthermore, prior to performing the above-described operation, a process for updating the TRP group for the manifold transmission may be needed.

The UE may receive a request for a channel quality value corresponding to a base station group, to which the manifold transmission method is applied, from the first base station. Thereafter, the UE may update the channel quality value corresponding to the base station group and may then transmit the updated channel quality value to the first base station. The UE may receive, from the first base station, identification information of the second base station, which is selected by the first base station, among the base station group. Thus, the UE may know (or acknowledge) that the second base station is included in the base station group for performing the manifold transmission.

Figure 12:
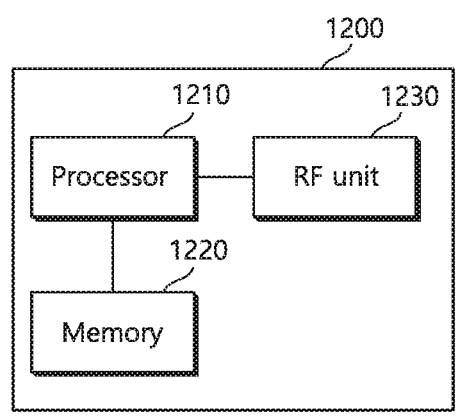
FIG. 12 is a block diagram showing an apparatus for wireless communication for implementing an embodiment of the present invention.

FIG. 12 is a block diagram showing an apparatus for wireless communication for implementing an embodiment of the present invention.

An apparatus (1200) for wireless communication includes a processor (1210), a memory (1220), and a radio frequency (RF) unit (1230).

The processor (1210) may be configured to implement proposed functions, procedures and/or methods described in this description. Layers of the radio interface protocol may be implemented in the processor (1210). The processor (1210) may handle a procedure explained above. The memory (1220) is operatively coupled with the processor (1210), and the RF unit (1230) is operatively coupled with the processor (1210).

The processor (1210) may include application-specific integrated circuit (ASIC), other chipset, logic circuit and/or data processing device. The memory (1220) may include read-only memory (ROM), random access memory (RAM), flash memory, memory card, storage medium and/or other storage device. The RF unit (1230) may include baseband circuitry to process radio frequency signals. When the embodiments are implemented in software, the techniques described herein can be implemented with modules (e.g., procedures, functions, and so on) that perform the functions described herein. The modules can be stored in the memory (1220) and executed by the processor (1210). The memory (1220) can be implemented within the processor (1210) or external to the processor (1210) in which case those can be communicatively coupled to the processor (1210) via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the scope of the appended claims.

What is claimed is:

1. A method for receiving a signal by a user equipment (UE) in a wireless communication system applying a manifold transmission technique, comprising:
    receiving manifold transmission activation information and control information for transmitting transport blocks from a first base station; and
    decoding the manifold transmission activation information and the control information, and receiving the transport blocks from the first base station and a second base station,
    wherein the manifold transmission activation information includes a manifold transmission activation indicator indicating a capability of the first base station and the second base station to transmit the transport blocks until a predetermined time.

2. The method of claim 1, further comprising:
receiving the manifold transmission activation information from the second base station,
wherein the manifold transmission activation information further includes the predetermined time and a number of the transmission blocks.

3. The method of claim 2, wherein the manifold transmission activation information is repeatedly received from a same resource, and
wherein the method further comprises:
combining the repeatedly received manifold transmission activation information and decoding the combined information.

4. The method of claim 3, wherein the manifold transmission activation information is configured to have a same bit length as the control information.

5. The method of claim 3, wherein manifold transmission activation information received from the first base station and manifold transmission activation information received from the second base station are configured of the same information, and
wherein manifold transmission activation information received from the first base station and manifold transmission activation information received from the second base station are received from the same resource.

6. The method of claim 1, further comprising:
combining transport blocks received from the first base station and the second base station and decoding the combined transport blocks,
wherein the transport blocks received from the first base station and the second base station are transmitted by using a bit length of a mother code being used by the first base station and the second base station, a code rate of the mother code, and a parity bit generation order.

7. The method of claim 6, wherein a bit length of the mother code being used by the first base station and the second base station is configured to be the same as the code rate of the mother code, and
wherein the parity bit generation order being used by the first base station and the second base station is determined in accordance with an identifier of the first base station and an identifier of the second base station.

8. The method of claim 1, wherein the control information includes resource allocation information for transmitting the transport block, a Modulation and Coding Scheme (MCS) level, a multi-antenna transmission method, a New Data Indicator (NDI), and a process identifier (ID).

9. The method of claim 8, wherein the process ID is mapped to the transport blocks being received from the first base station and the second base station,
wherein the process ID information is expired after the predetermined time or in case the NDI is triggered,
wherein, if time still remains before the process ID expires, the transport blocks received from the first base station and the second base station are combined and decoded, and
wherein, if the process ID is already expired, the transport blocks received from the first base station and the second base station are each decoded without being combined, or only the transport block received from the first base station is decoded.

10. The method of claim 1, further comprising:
receiving a request for a channel quality value corresponding to a base station group applying the manifold transmission technique from the first base station;
updating the channel quality value corresponding to the base station group and transmitting the updated channel quality value to the first base station; and
receiving identification information of the second base station being selected by the first base station, among the base station group, from the first base station.

11. A user equipment (UE) for receiving a signal in a wireless communication system applying a manifold transmission technique, comprising:
a processor that:
receives manifold transmission activation information and control information for transmitting transport blocks from a first base station, and
decodes the manifold transmission activation information and the control information, and receives the transport blocks from the first base station and a second base station,
wherein the manifold transmission activation information includes a manifold transmission activation indicator indicating a capability of the first base station and the second base station to transmit the transport blocks until a predetermined time.

12. The user equipment of claim 11, wherein the processor receives the manifold transmission activation information from the second base station, and
wherein the manifold transmission activation information further includes the predetermined time and a number of the transmission blocks.

13. The user equipment of claim 12, wherein the manifold transmission activation information is repeatedly received from a same resource, and
wherein the processor combines the repeatedly received manifold transmission activation information and decodes the combined information.

14. The user equipment of claim 13, wherein the manifold transmission activation information is configured to have a same bit length as the control information.

15. The user equipment of claim 13, wherein manifold transmission activation information received from the first base station and manifold transmission activation information received from the second base station are configured of the same information, and
wherein manifold transmission activation information received from the first base station and manifold transmission activation information received from the second base station are received from the same resource.

* * * * *